O. A. STEUTERMANN.
HEADLIGHT FOR AUTOMOBILES.
APPLICATION FILED JUNE 7, 1920.
1,380,264.
Patented May 31, 1921.
2 SHEETS—SHEET 1.
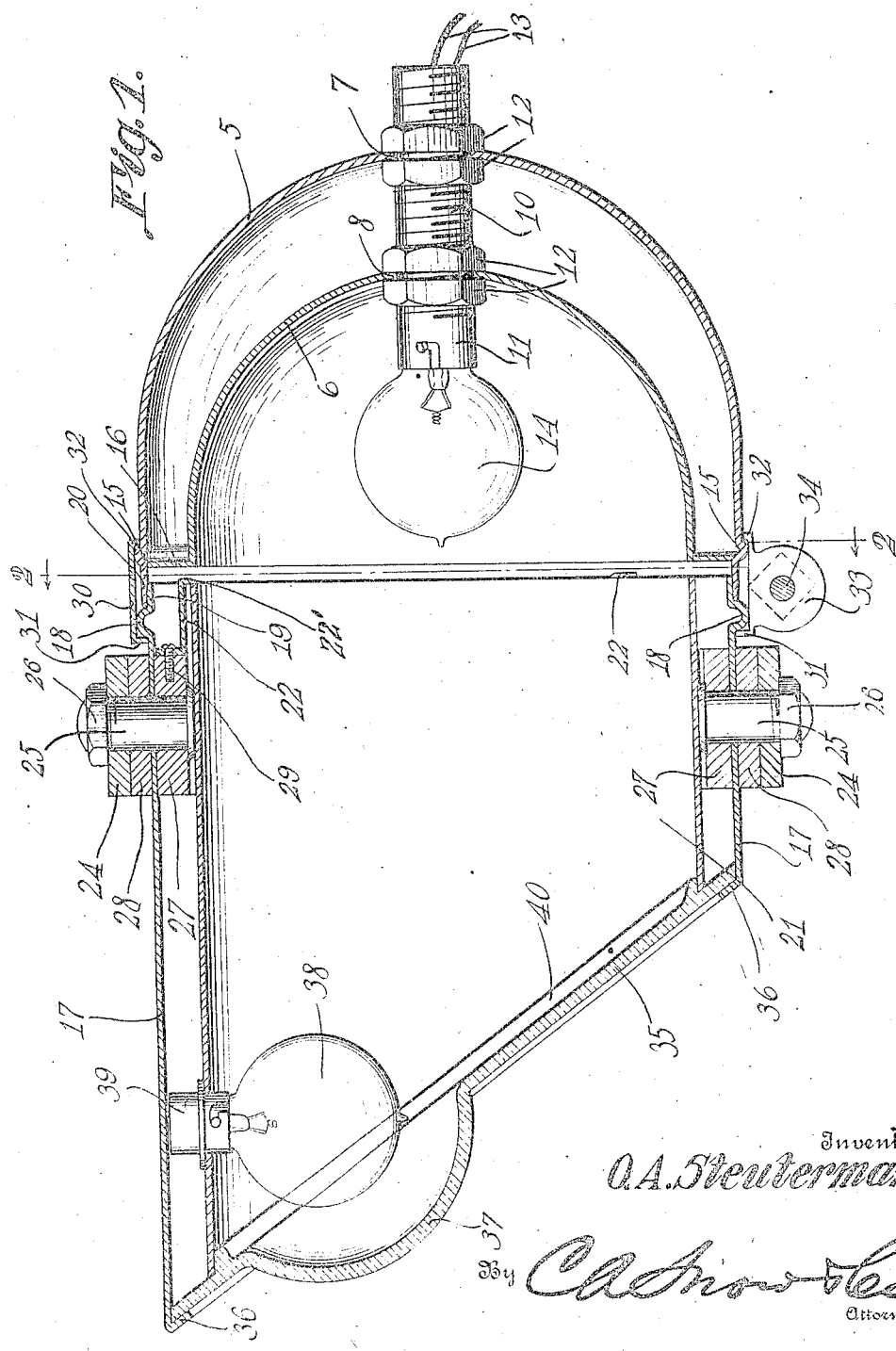
Inventor,
O. A. Steutermann
By
Attorneys O. A. STEUTERMANN.
HEADLIGHT FOR AUTOMOBILES.
APPLICATION FILED JUNE 7, 1920.
1,380,264.
Patented May 31, 1921.
2 SHEETS—SHEET 2.
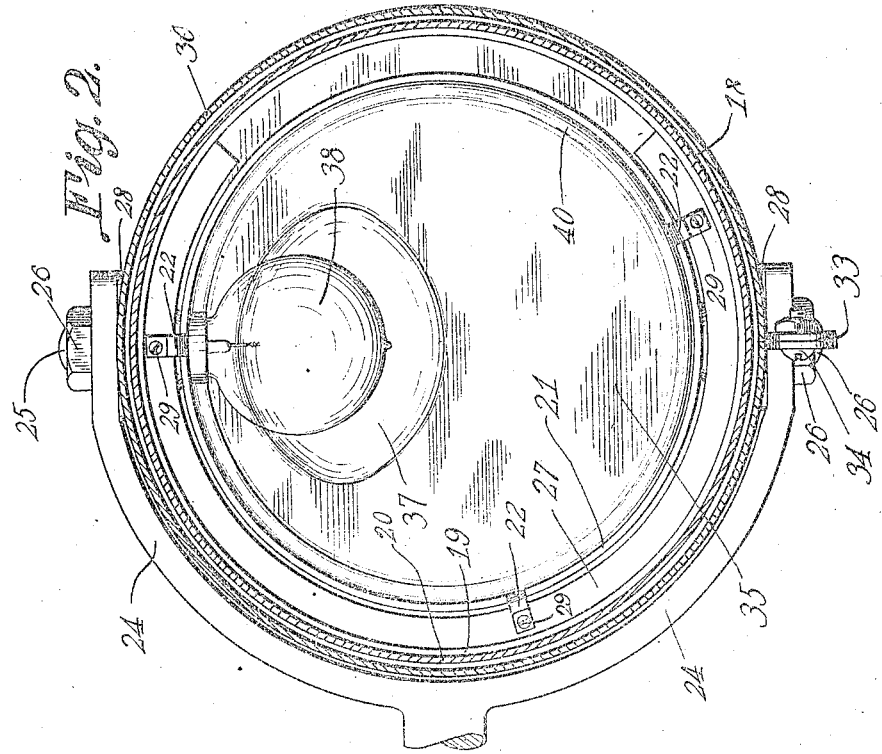
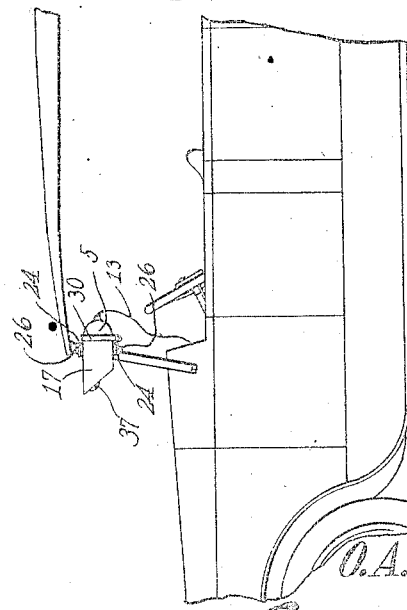
Inventor,
O. A. Steutermann
By
Attorneys

UNITED STATES PATENT OFFICE.

OTTO A. STEUTERMANN, OF READING, MASSACHUSETTS.

HEADLIGHT FOR AUTOMOBILES.

1,380,264.   Specification of Letters Patent.   Patented May 31, 1921.

Application filed June 7, 1920. Serial No. 387,132.

*To all whom it may concern:*

Be it known that I, OTTO A. STEUTERMANN, a citizen of the United States, residing at Reading, in the county of Middlesex and State of Massachusetts, have invented a new and useful Headlight for Automobiles, of which the following is a specification.

The present invention relates to automobile lamp constructions, and it is the primary object of the invention to provide a lamp adapted to be supported by the wind shield of an automobile, adjacent to the upper end thereof, or at a point to direct the light rays downwardly directly in front of the automobile, thereby eliminating the usual glare.

A further object of the invention is to provide a lamp of this character which will illuminate the engine of the automobile to facilitate the repair of the engine in the dark.

A further object of the invention is to provide a device of this character which will illuminate the forward portion of a machine, so that the entire outline of a machine may be observed by an approaching machine, so that the size and character of the machine supplied with the lights may be determined by the operator of an approaching machine.

A still further object of the invention is to provide a lamp which will be readily and easily disassembled so that the bulbs thereof may be removed and replaced, with comparatively little exertion on the part of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 illustrates a longitudinal sectional view through a lamp constructed in accordance with the present invention.

Fig. 2 illustrates a sectional view taken on line 2—2 of Fig. 1.

Fig. 3 illustrates a fragmental view of a motor vehicle disclosing the invention as applied thereto.

Referring to the drawings in detail, the lamp forming the subject matter of the present invention is especially constructed to be positioned on the frame of the wind shield of a motor vehicle, the particular construction of the lamp being such as to illuminate the engine of the motor vehicle to facilitate the repair thereof, in the dark.

As shown, the main or body portion of the lamp includes a curved rear wall 5, and a curved reflecting surface 6, the reflecting surface 6 being disposed in spaced relation with the rear wall 5 to provide a cooling space between the reflecting rear surface and rear wall 5; there being provided registering openings 7 and 8, in the rear wall 5 and reflecting surface respectively, for the reception of the threaded connecting member 10, which carries a lamp socket 11 on one extremity thereof.

Securing nuts 12 are disposed on the connecting member 10 and clamp the reflecting surface 6 and rear wall 5 to the connecting member in a manner to prevent displacement of the connecting member. This connecting member 10 is hollow, and receives the wires 13 providing the circuit for the bulb 14, the wires of course having connection with a suitable source of electric supply to cause the illumination of the bulb 14.

The forward portion of the rear wall 5 of the body portion is provided with a circumferential bead 15, the inner reflecting surface having its forward extremity bent at right angles to the main portion thereof as at 16, the periphery of said right angled portion contacting with the inner surface of the rear wall 5, to maintain a forward portion of the body in spaced relation with the rear wall 5.

The forward section of the lamp is detachably connected with the body portion and includes an outer circular member 17 which is also provided with a circumferential beaded portion 18 disposed adjacent to the rear edge thereof, there being a flange 19 forming the rear portion of the forward section, the diameter of which is slightly less than the diameter of the forward portion 20 of the rear wall 5, to permit the flange 19 to be inserted within the forward portion of the rear wall 5.

The body of the forward section comprises a tubular member 21, which is secured to the bracket by means of the securing clips 22, which have the right angled end portion 22' thereof disposed adjacent to the inner edge of the tubular member 21.

The bracket comprises the curved arms 24 which are apertured adjacent the free ends thereof, which apertures accommodate the bolts 25 there being provided suitable openings in the outer circular member 17, registering with the apertures of the curved arms 24 so that these bolts 25 will secure the arms to the forward section, the nuts 26 operating on the threaded portions of the bolts 25, adapted to clamp the forward section to the arms 24.

Clamping ring 27 and block 28 are also secured to the forward section by the bolts 25, the clamping ring being shown as disposed on the inner side of the outer circular member 17, there being provided, however, suitable openings in the clamping ring 27 to accommodate the screws 29 which connect the securing clips to the ring 27.

Coöperating with the beaded portions 15 and 18 is a split ring indicated at 30, which ring is provided with opposed right angled flanges 31 and 32 which engage opposite surfaces of the beaded portions 15 and 18, to clamp the forward section to the body portion of the lamp. Ears 33 are formed at the free ends of this ring 30 which ears are apertured to receive the securing bolt 34 by means of which the ring is secured in position on the lamp.

As shown, the forward portion of the forward section is formed at an angle so that the lens 35 may be disposed at an angle with relation to the perpendicular, the forward portion of the member 17 extending at an angle as at 36 to provide a securing flange for securing the lens 35 in position. This lens is of a particular construction and is provided with a bulged portion 37 adjacent the upper edge thereof, which bulged portion conforms to the curvature of the bulb 38, which is secured to the tubular member 21 by means of the socket member 39.

From the foregoing it is obvious that the bulb 38 has the function of illuminating the engine and forward portion of a machine.

It might be further stated that the lens 35 is provided with an integral flange 40, to contact with the member 21 to support the outer edge thereof in proper spaced relation with the circular member 27.

Having thus described the invention, what is claimed as new is:—

1. A lamp including a forward section and a rear section, the rear section including a curved rear wall and a reflecting wall, said walls being disposed in spaced relation with each other, a bulb carried by each section, a lens carried by the forward section and disposed at an angle to the perpendicular, the bulb in the forward section being supported in a position to direct its light rays downwardly, a bracket member having connection with the forward section, and means for removably securing the sections together.

2. A lamp including a forward section and a rear section, the rear section including a rear curved wall, and a reflecting wall, each of the walls being provided with an opening, a connecting member extending through the openings and having a threaded periphery, clamping nuts on the connecting member, and adapted to clamp the rear curved wall and reflecting wall, a lamp carried by each of the sections, a bracket having connection with the forward section, and means for securing the sections together.

In testimony that I claim the foregoing as my own I have hereto affixed my signature in the presence of two witnesses.

OTTO A. STEUTERMANN.

Witnesses:
 ERNEST L. GLAESER,
 CHARLES E. MELLEN.